US010718683B2

(12) United States Patent
Chiu (10) Patent No.: US 10,718,683 B2
(45) Date of Patent: Jul. 21, 2020

(54) PIPELINE LEAKAGE DETECTION SYSTEM AND METHOD THEREOF

(71) Applicants: Inventec (Pudong) Technology Corporation, Shanghai (CN); Inventec Corporation, Taipei (TW)

(72) Inventor: Chaucer Chiu, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 294 days.

(21) Appl. No.: 16/010,019

(22) Filed: Jun. 15, 2018

(65) Prior Publication Data

US 2019/0170597 A1    Jun. 6, 2019

(30) Foreign Application Priority Data

Dec. 5, 2017 (CN) .......................... 2017 1 1267381

(51) Int. Cl.
*G01N 21/954* (2006.01)
*G01M 3/00* (2006.01)
(Continued)

(52) U.S. Cl.
CPC ........... *G01M 3/002* (2013.01); *G01N 21/954* (2013.01); *G01N 29/0654* (2013.01); *G01N 29/225* (2013.01); *G01N 29/265* (2013.01)

(58) Field of Classification Search
CPC ........ G01K 13/00; G01K 1/143; G01N 25/72; G01N 2291/0289; G01N 29/225;
(Continued)

(56) References Cited

U.S. PATENT DOCUMENTS 3,060,315 A * 10/1962 Scherbatskoy ....... G01M 3/005
250/390.04
4,607,925 A * 8/1986 Kamigaichi ......... G03B 37/005
346/33 P
(Continued)

FOREIGN PATENT DOCUMENTS

AU      2006209839 B2 * 12/2010 .............. F16L 55/38
CN         103743378 A  *  4/2014
(Continued)

*Primary Examiner* — Gail Kaplan Verbitsky
(74) *Attorney, Agent, or Firm* — David R. Stevens; Stevens Law Group (57) ABSTRACT

A pipeline leakage detection system and a method thereof are provided. In the pipeline leakage detection system, when a ball-type detection device is operated on a pipeline and moved by an external force, a processing module can, according to angular velocity data outputted by a posture detection module, control motors to drive wheels, so as to prevent a ball-type casing of the ball-type detection device from being rotated by the external force; a wireless transceiver module transmits thermal image signals around the pipeline captured by multiple infrared thermal imagers to a monitoring terminal; and the monitoring terminal combines the thermal image signals, according to a sequential order of pieces of time information of the thermal image signals and pieces of identification information of the infrared thermal imagers, to form multiple time images, and the monitoring terminal can analyze the time images to determine whether the pipeline has a leaking location.

10 Claims, 9 Drawing Sheets

(51) Int. Cl.
*G01N 29/22* (2006.01)
*G01N 29/265* (2006.01)
*G01N 29/06* (2006.01)

(58) Field of Classification Search
CPC ............... G01N 29/265; G01N 21/954; G01N 29/0654; G01J 5/00
See application file for complete search history.

(56) References Cited

U.S. PATENT DOCUMENTS

| | | | | |
|---|---|---|---|---|
| 5,228,329 | A * | 7/1993 | Dennison | G01F 1/684 374/5 |
| 9,482,582 | B2 * | 11/2016 | Kreutzer | G01J 5/04 |
| 2006/0152589 | A1 * | 7/2006 | Morrison | G06T 7/30 348/208.1 |
| 2011/0103189 | A1 * | 5/2011 | Paulson | G01S 11/14 367/89 |
| 2014/0054525 | A1 * | 2/2014 | Spijker | F16L 55/00 254/134.3 R |
| 2014/0345367 | A1 * | 11/2014 | Mekid | G01M 3/2823 73/40.5 R |
| 2017/0198854 | A1 * | 7/2017 | Gagliardo | F16L 55/1645 |
| 2018/0117718 | A1 * | 5/2018 | Rajagopalan | B23K 37/0531 |
| 2019/0172194 | A1 * | 6/2019 | Starr | G06T 7/62 |
| 2020/0103064 | A1 * | 4/2020 | Kiest, Jr. | F16L 55/265 |

FOREIGN PATENT DOCUMENTS

| | | | |
|---|---|---|---|
| CN | 106896420 A | * | 6/2017 |
| JP | 62211537 A | * | 9/1987 |

* cited by examiner

Providing a ball-type detection device and a monitoring terminal, wherein the ball-type detection device comprises a ball-type casing, a posture detection module, a controlling module, a processing module, a plurality of infrared thermal imagers and a wireless transceiver module, and the controlling module is disposed in the ball-type casing and comprises a plurality of wheels, a plurality of motors and a bearing base, and the plurality of wheels are disposed correspondingly to the plurality of motors one-to-one, and the plurality of motors are configured to drive the plurality of wheels respectively, and the plurality of wheels are in rolling contact with the bottom of the ball-type casing, and the bearing base includes a plurality of rolling units disposed thereon and configured to support the bearing base on the ball-type casing, and the processing module is disposed on the bearing base and electrically connected to the plurality of motors, and the posture detection module and the plurality of infrared thermal imagers are fixed on the ball-type casing, and the wireless transceiver module is electrically connected to the infrared thermal imagers — 210

Operating the ball-type detection device in a pipeline and applying an external force to move the ball-type detection device — 220

Sensing, by the posture detection module, an angular velocity of the ball-type casing to output angular velocity data — 230

Controlling, by the processing module, according to the angular velocity data, the plurality of motors to drive the plurality of wheels, so as to prevent the ball-type casing from being rotated by the external force — 240

Capturing, by each of the plurality of infrared thermal imagers, thermal image signals around the pipeline, wherein each thermal image signal comprises time information and identification information of the infrared thermal imager corresponding thereto — 250

FIG. 8

PIPELINE LEAKAGE DETECTION SYSTEM AND METHOD THEREOF

CROSS-REFERENCE TO RELATED APPLICATION

This application claims the benefit of Chinese Patent Application No. 201711267381.X, filed Dec. 5, 2017.

BACKGROUND OF THE INVENTION

Field of the Invention

The present invention generally relates to a detection system and a method thereof, more particularly to a pipeline leakage detection system and a method thereof.

Description of the Related Art

Water pipelines are distributed and connected complicatedly, and are buried under the ground to be affected by various pressures, earthquakes, and water pressure inside the pipeline, for a long time, so pipeline leakage can occur anywhere and anytime. If the water company cannot detect the leaking location in time, it may cause a waste of water resources. For this reason, in order to detect the location of water leakage timely and accurately, various detection methods are developed.

In recent years, most of the leakage detection devices and technologies apply acoustic wave detection to determine whether the pipeline has the leaking location according to detection of the noise generated by the water emitted from the leaking location. However, the intensity of noise attenuation varies because of the size of the leaking place, water pressure, pipeline material, pipeline length, pipe diameter and soil medium, it is not easy to distinguish the noise generated by some leaking locations.

Therefore, what is needed is to develop an improved technical solution to solve the conventional problem that the detection accuracy of conventional leakage detection device may be affected by the size of leakage place, the water pressure, the pipeline material, the pipeline length, the pipe diameter, the soil medium to make it difficult to distinguish some leaking locations.

SUMMARY OF THE INVENTION

In order to solve conventional problem, the present invention is to provide a pipeline leakage detection system d a method thereof.

According to an embodiment, the present invention provides a pipeline leakage detection system comprising a ball-type detection device and a monitoring terminal. The ball-type detection device is operated in a pipeline and moved by an external force, and includes a ball-type casing, a posture detection module, a controlling module, a processing module, a plurality of infrared thermal imagers and a wireless transceiver module. The posture detection module is fixed on the ball-type casing and configured to sense an angular velocity of the ball-type casing to output angular velocity data. The controlling module is disposed in the ball-type casing, and includes a plurality of wheels, a plurality of motors and a bearing base. The plurality of wheels are disposed correspondingly to the plurality of motors one-to-one, and the plurality of motors are configured to drive the plurality of wheels, and the plurality of wheel are in rolling contact with a bottom of the ball-type casing, and the bearing base is configured to carry the posture detection module, and includes a plurality of rolling units disposed thereon, and the plurality of rolling units are configured to support the bearing base on the ball-type casing. The processing module is disposed on the bearing base and electrically connected to the plurality of motors, and configured to control, according to the angular velocity data, the plurality of motors to drive the plurality of wheels, so as to prevent the ball-type casing from being rotated by the external force. The infrared thermal imagers are fixed on the ball-type casing, and each infrared thermal imager is configured to capture thermal image signals around the pipeline, and each thermal image signal comprises time information and identification information of the infrared thermal imager corresponding thereto. The wireless transceiver module is electrically connected to the plurality of infrared thermal imagers and configured to transmit the plurality of thermal image signals. The monitoring terminal is configured to combine the plurality of thermal image signals, according to a sequential order of the pieces of time information contained in the plurality of thermal image signals and the pieces of identification information of the infrared thermal imagers corresponding to the plurality of thermal image signals, respectively, to form a plurality of time images, and performs image analysis on the plurality of time images to determine whether the pipeline has a leaking location.

According to an embodiment, the present invention provides a pipeline leakage detection method comprising steps of: providing a ball-type detection device and a monitoring terminal, wherein the ball-type detection device comprises a ball-type casing, a posture detection module, a controlling module, a processing module, a plurality of infrared thermal imagers and a wireless transceiver module, and the controlling module is disposed in the ball-type casing and comprises a plurality of wheels, a plurality of motors and a bearing base, and the plurality of wheels are disposed correspondingly to the plurality of motors one-to-one, and the plurality of motors are configured to drive the plurality of wheels, and the plurality of wheels are in rolling contact with a bottom of the ball-type casing, and the bearing base includes a plurality of rolling units disposed thereon and the plurality of rolling units are configured to support the bearing base on the ball-type casing, and the processing module is disposed on the bearing base and electrically connected to the plurality of motors, and the posture detection module and the plurality of infrared thermal imagers are fixed on the ball-type casing, and the wireless transceiver module is connected to the plurality of infrared thermal imagers; operating the ball-type detection device in a pipeline, and applying an external force to move the ball-type detection device; sensing, by the posture detection module, an angular velocity of the ball-type casing to output angular velocity data; controlling, by the processing module, according to the angular velocity data, the plurality of motors to drive the plurality of wheels, to prevent the ball-type casing from being rotated by the external force; capturing, by each of the plurality of infrared thermal imagers, thermal image signals around the pipeline, wherein each of the plurality of thermal image signals comprises time information and identification information of the infrared thermal imager corresponding thereto; transmitting, by the wireless transceiver module, the plurality of thermal image signals to the monitoring terminal; and combining, by the monitoring terminal, the plurality of thermal image signals, according to a sequential order of the pieces of time information contained in the plurality of thermal image signals and the pieces of identification information of the infrared thermal imagers corresponding to the plurality of thermal image signals, respectively, to form a plurality of time images, and performing, by the monitoring terminal, image analysis on the plurality of time images to determine whether the pipeline has a leaking location.

According to above contents, the difference between the conventional technology and the technology of the present invention is that, in the system and the method of the present invention, the ball-type detection device can be operated in the pipeline and moved by the external force, and the processing module can control, according to the angular velocity data sensed by and outputted from the posture detection module, the motors to drive the wheels corresponding thereto, so as to prevent the ball-type casing from being rotated by the external force; furthermore, the wireless transceiver module can transmit thermal image signals around the pipeline captured by the infrared thermal imagers to monitoring terminal; and the monitoring terminal can combine the thermal image signals, according to the sequential order of the pieces of time information contained in the plurality of thermal image signals and the pieces of identification information of the infrared thermal imagers corresponding to the plurality of thermal image signals, to form the plurality time images, and perform image analysis on the plurality of time images.

By using aforementioned technical solution, the pipeline leakage detection system and method of the present invention can achieve the technical effect of detecting whether the pipeline has the leaking location.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be understood that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be understood to imply the inclusion of stated elements but not the exclusion of any other elements.

The nouns defined in the present invention are illustrated before description of a pipeline leakage detection system and a method thereof. The ball-type detection device, the monitoring terminal, the controlling device, and the navigation device included in the pipeline leakage detection system can be implemented by various manners including software, hardware, firmware or any combination thereof. In an embodiment, the software or firmware used for implementation of the present invention can be stored in machine-readable storage medium such as ROM memory, RAM memory, magnetic disk storage medium, optical storage medium, flash memory device and so on, and can be performed by at least one general-purpose programmable microprocessor or dedicated programmable microprocessor. The ball-type detection device, the monitoring terminal, the controlling device, and the navigation device included in the pipeline leakage detection system can communicate with each other through a network, such as a mobile communication network, an internee network, a local area network, a Wide Area Network, a wireless network, or a combination thereof.

Figure 1:
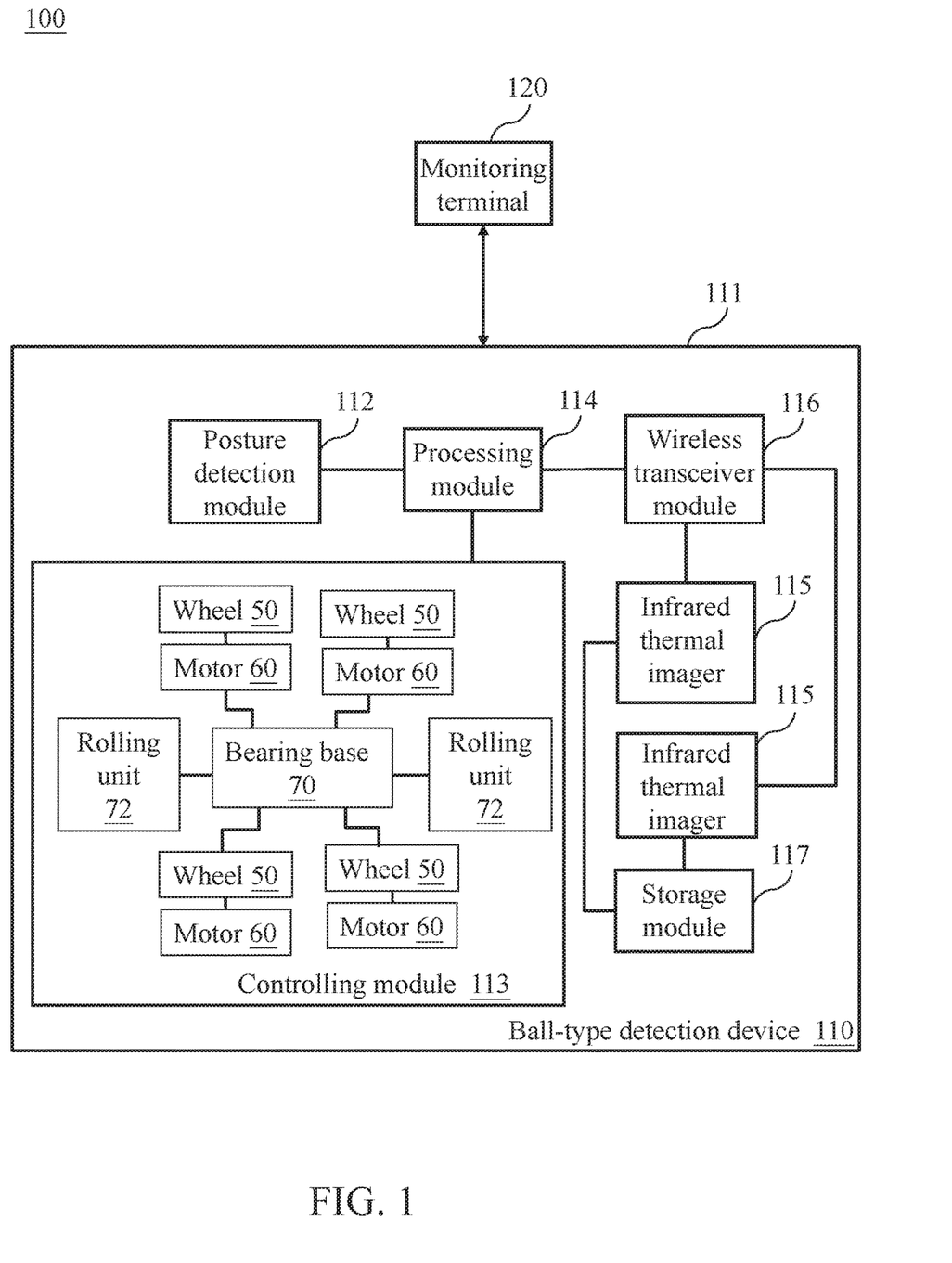
FIG. 1 is a block diagram of a pipeline leakage detection system of an embodiment of the present invention.
Figure 2:
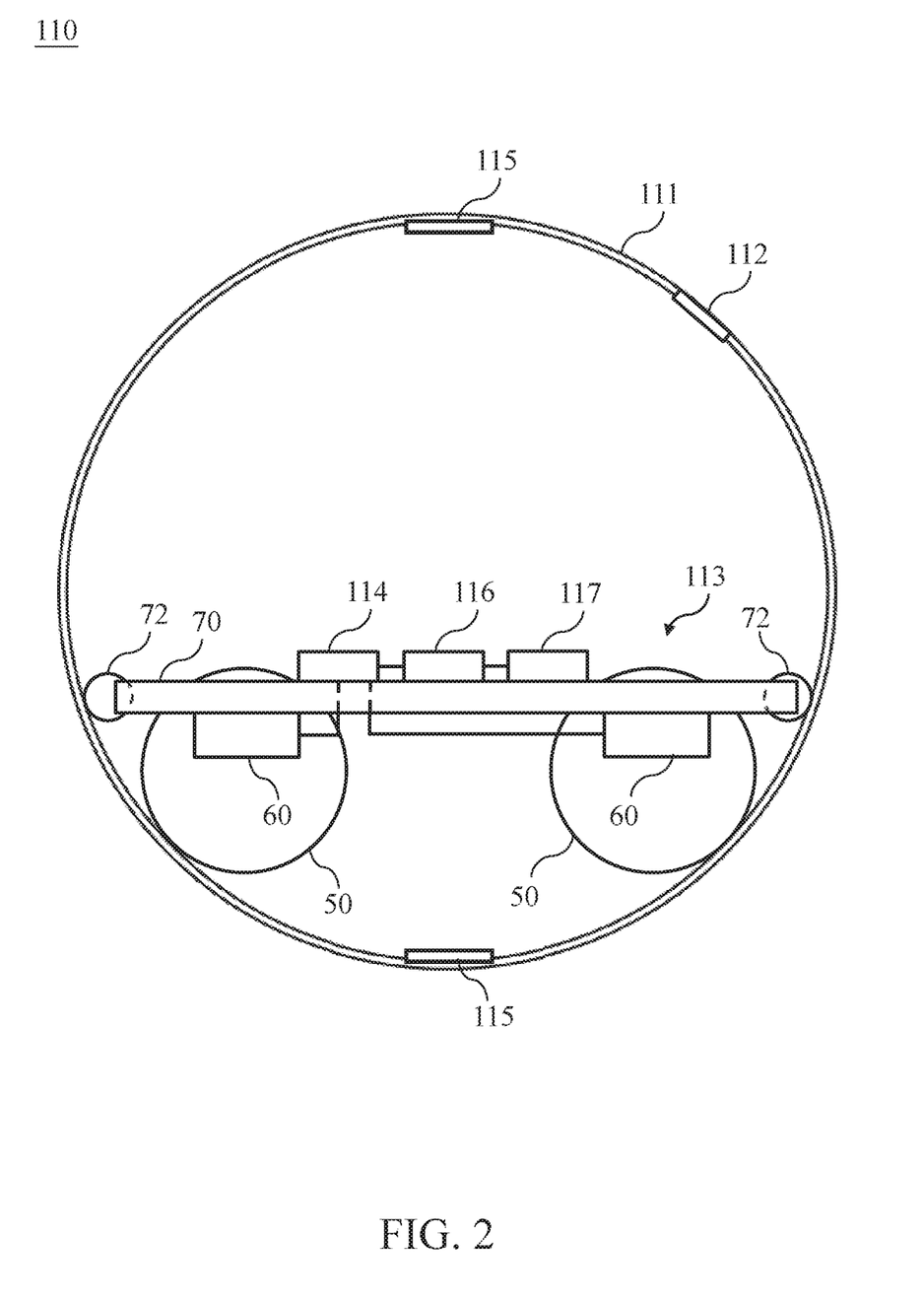
FIG. 2 is a cross-sectional view of a structure of the ball-type detection device of FIG. 1.

The pipeline leakage detection system and the method thereof of the present invention will hereinafter be described in more detail with reference to the accompanying drawings. Please refer to FIGS. 1 and 2. FIG. 1 is a block diagram of a pipeline leakage detection system of an embodiment of the present invention, and FIG. 2 is a cross-sectional view of a structure of the ball-type detection device of FIG. 1. A pipeline leakage detection system 100 comprises a ball-type detection device 110 and a monitoring terminal 120. The number of ball-type detection device 110 can be one, but the present invention is not limited thereto; and, the number of monitoring terminal 120 can be one, but the present invention is not limited thereto. In actual application, the numbers of the ball-type detection device 110 and the monitoring terminal 120 can be adjusted upon demand.

In the embodiment; the ball-type detection device 110 can be operated in a pipeline and moved by an external force, and can comprise a ball-type casing 111, a posture detection module 112, a controlling module 113, a processing module 114, a plurality of infrared thermal imagers 115 and a wireless transceiver module 116. The controlling module 113, the processing module 114 and the wireless transceiver module 116 are disposed in the ball-type casing 111. The posture detection module 112 and the plurality of infrared thermal imagers 115 are fixed on the ball-type casing 111. The wireless transceiver module 116 can be electrically to the plurality of infrared thermal imagers 115 and the processing module 114 by wireless manner or wired manner. The posture detection module 112 can be fixed on the ball-type casing 111 by an embedment manner. Preferably, the posture detection module 112 can be, but not limited to, a gyroscope. The ball-type casing 111 is a spherical shell member, and can be, but not limited to, a transparent shell member. Each infrared thermal imager 115 is configured to gather infrared radiation energy from a target object in a view field thereof and convert the infrared radiation energy into a temperature value. The size of the view field of the infrared thermal imager 115 is determined by the optical components of the infrared thermal imager 115 and a location of the infrared thermal imager 115. An object having temperature can radiate infrared light, and the object may radiate different intensities of infrared light when having different temperatures. In this embodiment, for example, two infrared thermal imagers 115 can be provided to be embedded and fixed at two opposite inner sides of the ball-type casing 111, respectively; that is, when the two infrared thermal imagers 115 are connected by a line, it can observe that the two infrared thermal imagers 115 are disposed on two ends of a diameter of the ball-type casing 111, respectively. Each infrared thermal imager 115 is configured to captures thermal image signals around the pipeline. In this embodiment, each infrared thermal imager 115 can capture the thermal image signal in at least 180 degrees of wide angle range, that is, each infrared thermal imager 115 can gather the infrared radiation energy of at least 180 degrees of view field, so that the infrared thermal imagers 115 in cooperation with each other can capture full-angle thermal image signals; however, the present invention is not limited to this embodiment; the number, locations and configuration of the infrared thermal imagers 115 can be adjusted according to the user's requirement and the size of view field of each infrared thermal imager 115.

The controlling module 113 comprises a plurality of wheels 50, a plurality of motors 60 and a bearing base 70. The plurality of wheels 50 are disposed correspondingly to the plurality of motors 60 one-to-one, and the processing module 114 is electrically connected to the plurality of motors 60. The motors 60 are configured to drive the wheels 50 which are in rolling contact with a bottom of the ball-type casing 111. The bearing base 70 is configured to carry the processing module 114, and can include a plurality of rolling units 72 disposed thereon and the plurality of rolling units 72 are configured to support the bearing base on the ball-type casing 111, so as to make the bearing base 70 slidable inside the ball-type casing 111. In this embodiment, the numbers of the motor 60 and the wheel 50 can be four; respectively; however, the present invention is not limited to this embodiment. In actual application; the numbers of the motor 60 and the wheel 50 can be adjusted, upon practical demand. Furthermore, the controlling module 113 can be disposed at a lower position inside the ball-type casing 111, to lower a center of gravity of the ball-type detection device 110; so that the ball-type casing 111 can behave as a tumbler in a normal condition. It should be noted that the four wheels 50 and the four motors 60 are disposed on the bearing base 70 with symmetry and FIG. 2 is a sectional view of the ball-type detection device 110, so only two wheels 50 and two motors 60 are drawn in FIG. 2.

The posture detection module 112 is configured to sense an angular velocity of the ball-type casing 111 to output angular velocity data. The processing module 114 is configured to control, according to the angular velocity data, the plurality of motors 60 to drive the plurality of wheels 50, so as to prevent the ball-type casing 111 from being rotated by the external force. Each infrared thermal imager 115 is configured to capture thermal image signals around the pipeline, and each thermal image signal comprises time information and identification information of the infrared thermal imager 115 corresponding thereto. The wireless transceiver module 116 is configured to transmit the thermal image signals. The monitoring terminal 120 combines the plurality of thermal image signals, according to a sequential order of the pieces of time information contained in the plurality of thermal image signals and the pieces of identification information of the infrared thermal imagers 115 corresponding to the plurality of thermal image signals, respectively, to form a plurality of time images, and performs image analysis on the plurality of time images to determine whether the pipeline has a leaking location. The identification information of the infrared thermal imager 115 can be used to differentiating infrared thermal imagers 115.

In greater detail, while the ball-type detection device 110 is being operated in the pipeline, the processing module 114 can control the plurality of motors 60 to drive the plurality of wheels 50 according to the angular velocity data outputted from the posture detection module 112, so that the ball-type casing 111 can be moved by the external force but not rotated by the external force, thereby improving the stability of the plurality of infrared thermal imagers 115 capturing the thermal image signals. Furthermore, the infrared thermal imagers 115 are disposed to capture full-angle thermal image signals, and each thermal image signal comprises the time information and the identification information of the infrared thermal imager 115 corresponding thereto, that is, each thermal image signal records the information that the thermal image signal is captured by which infrared thermal imager 115 at which time point, so the monitoring terminal 120 can combine the plurality of thermal image signals, according to the sequential order of the pieces of time information contained in the plurality of thermal image signals and the pieces of identification information of the infrared thermal imagers corresponding to the plurality of thermal image signals, respectively, to form the plurality of time images. Each time image is formed by combining the thermal image signals around the pipeline and captured by the plurality of infrared thermal imagers 115 at the same time point when the ball-type detection device 110 is moving in the pipeline. The monitoring terminal 120 can perform the image analysis on the plurality of time images. The location of the ball-type detection device 110 in the pipeline at each time point can be deduced from the time duration and a distance of movement of the ball-type detection device 110 in the pipeline, so that when one of the time images indicates that the temperature of ambient environment of the pipeline is changed, the monitoring terminal 120 can determine, according to the time information corresponding to this time image, where is the leaking location of the pipeline. As a result, the monitoring terminal 120 can analyze the plurality of time images to determine the leaking location of the pipeline.

In order to more accurately determine the leaking location of the pipeline, each thermal image signal can further comprise location information, and the monitoring terminal 120 can combine the plurality of thermal image signals, according to the pieces of location information contained in the plurality of thermal image signals and the pieces of identification information of the infrared thermal imagers corresponding to the plurality of thermal image signals, to form a plurality of panoramic images, and perform image analysis on the plurality of panoramic image to determine whether the pipeline has the leaking location. In greater detail, Each thermal image signal can comprise the location information, so that the monitoring terminal 120 can combine the plurality of thermal image signals, according to the pieces of location information contained in the plurality of thermal image signals and the pieces of identification information of the infrared thermal imagers corresponding to the plurality of thermal image signals, to form the plurality of panoramic images, that is, each panoramic image is formed by combining the thermal image signals captured by the infrared thermal imagers 115 and around the pipeline at every moving location of the ball-type detection device 110 in the pipeline. The monitoring terminal 120 can perform image analysis on the plurality of panoramic images, and when one of the panoramic images indicates that the temperature of ambient environment of the pipeline is changed, the monitoring terminal 120 can determine, according to the location information corresponding to this panoramic image, where is the leaking location of the pipeline. The location information contained in each thermal image signal can be provided by the positioning unit (not shown in figures) of each infrared thermal imager 115, and can include but not limited to, longitude and latitude coordinates; however; the present invention is not limited to this embodiment.

Furthermore, in this embodiment, the ball-type detection device 110 can comprise a storage module 117 configured to store the thermal image signals according to the sequential order of the pieces of the time information contained in the plurality of thermal image signals and the pieces of identification information of the infrared thermal imagers corresponding to the plurality of thermal image signals, so as to back up and save data. Preferably, the storage module 117 can be electrically to the plurality of infrared thermal imagers 115 and the wireless transceiver module 116 by wireless manner or wired manner.

Figure 3:
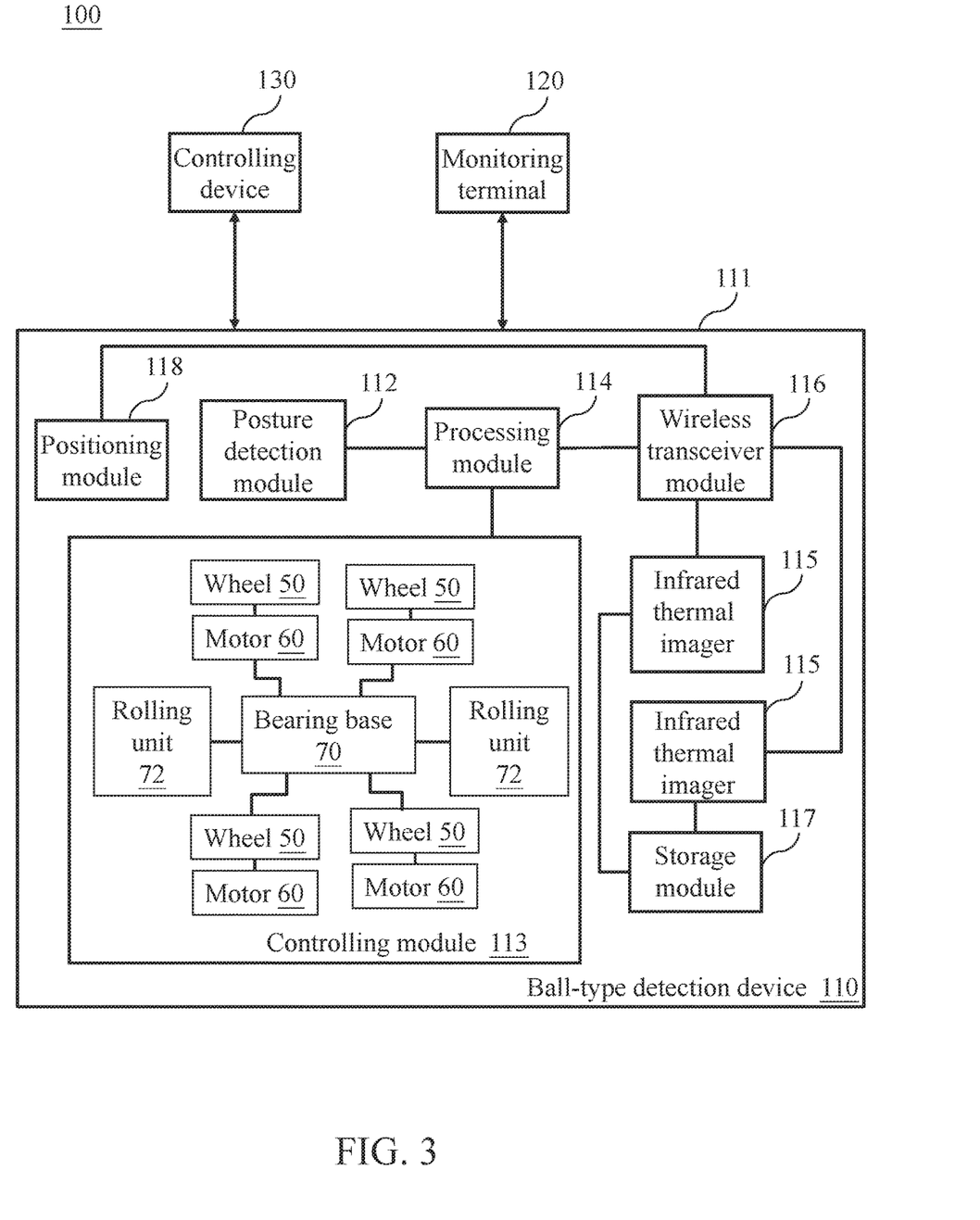
FIG. 3 is a block diagram of a pipeline leakage detection system of another embodiment the present invention.
Figure 4:
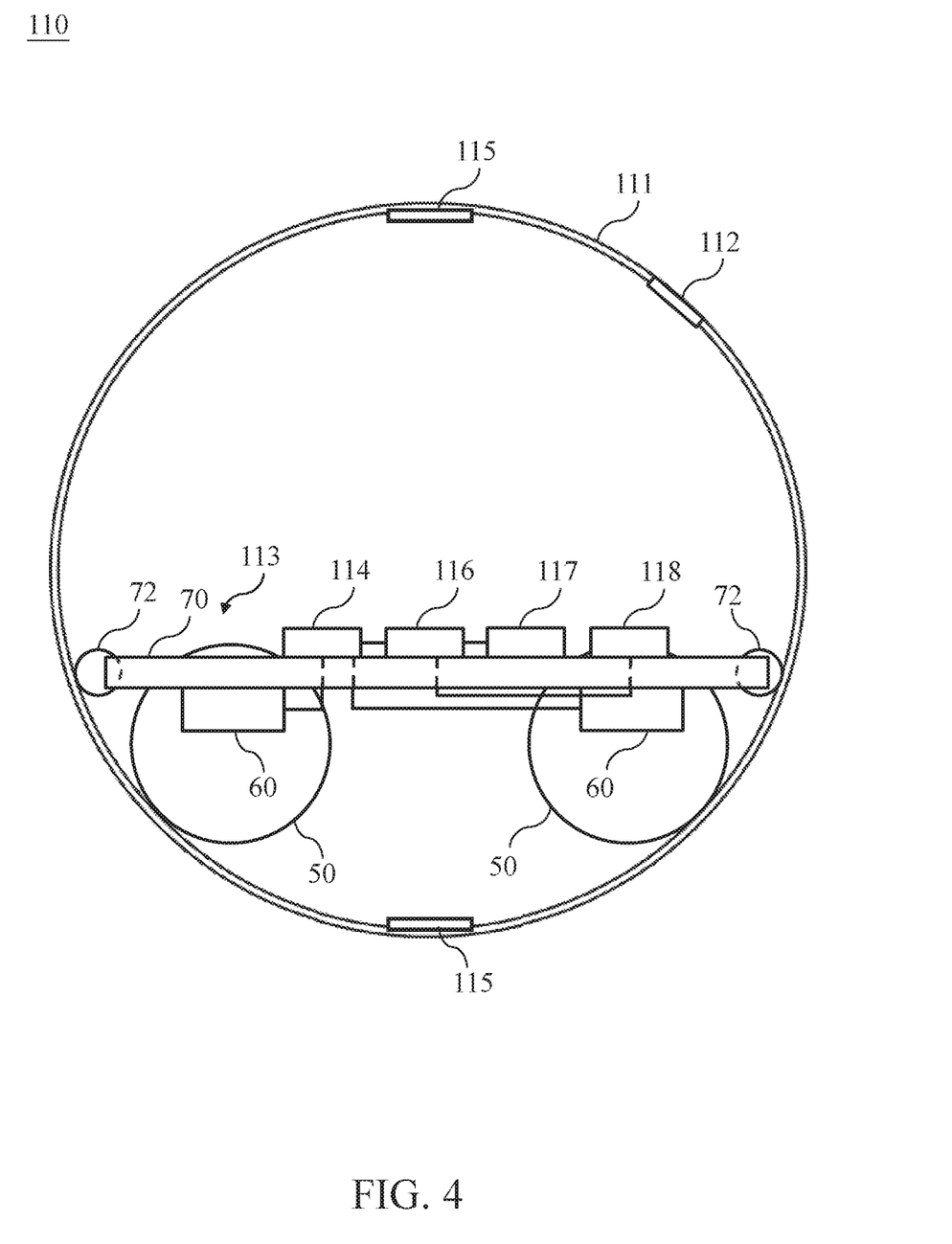
FIG. 4 is a cross-sectional view of a structure of the ball-type detection device of FIG. 3.

Please refer to FIGS. 3 and 4. FIG. 3 is a block diagram of a pipeline leakage detection system of another embodiment the present invention, and FIG. 4 is a cross-sectional view of a structure of the ball-type detection device of FIG. 3. In this embodiment, in order to enable the ball-type detection device 110 to enter a particular location in an anticipated pipeline for detecting the leaking location according to the user's requirement; the ball-type detection device 110 can include the ball-type casing 111, the posture detection module 112; the controlling module 113, the processing module 114, the plurality of infrared thermal imagers 115 and the wireless transceiver module 116 and a positioning module 118. The positioning module 118 is disposed on the bearing base 70 and electrically connected to the processing module 114, and configured to position the ball-type detection device 110 and transmit positioning information through the wireless transceiver module 116. In the embodiment; the pipeline leakage detection system 100 can include the ball-type detection device 110, the monitoring terminal 120 and a controlling device 130. The controlling device 130 is configured to receive the positioning information and transmit a control signal to the wireless transceiver module 116. The processing module 114 can control, according to the control signal received by the wireless transceiver module 116, the plurality of motors 60 to drive the plurality of wheels 50, so that the ball-type detection device 110 can be moved to the specific location of the pipeline, which is the particular location in the anticipated pipeline.

In greater detail; the positioning module 118 of the ball-type detection device 110 can be, but not limited to, a positioning module having global satellite positioning system (GPS), and the positioning module 118 can transmit the positioning information to the controlling device 130. The controlling device 130 can display the positioning information or convert the positioning information into speech message and broadcast the speech message, for the user to know the location of the ball-type detection device 110. Upon demand, the user can transmit, through the controlling device 130, the control signal to the wireless transceiver module 116, so that the processing module 114 can control, according to the control signal received by the wireless transceiver module 116, the plurality of motors 60 to drive the plurality of wheels 50, thereby controlling the ball-type detection device 110 to move to the specific location of the pipeline. In other words, when the user knows, through the controlling device 130, that the current location of the ball-type detection device 110 is the particular location of the anticipated pipeline, it indicates that the ball-type detection device 110 reaches the specific location of the pipeline. Preferably, the control signal can be, but not limited to, an instruction of controlling the ball-type detection device 110 to rotate in situ, move straight, move backwardly or make a turn. Each wheel 50 can be an omnidirectional wheel, so the processing module 114 can control, according to the control signal, the plurality of motors 60 to drive the plurality of wheel 50 to provide the motion mode of controlling the ball-type casing 111 to rotate in situ, move straight, move backwardly or make a turn; as a result, the user can use the controlling device 130 to control the ball-type detection device 110 to move to the specific location of the pipeline for detecting leaking location. It should be noted that the user can operate the controlling device 130 to transmit the control signal with reference to a configuration map of exist pipelines, so as to effectively control the ball-type detection device 110 to reach specific location of the pipeline. Furthermore, in this embodiment, the plurality of infrared thermal imagers 115 can capture full-angle thermal image signals, so that in the process of the ball-type detection device 110 moving to the specific location, the leakage detection function of the ball-type detection device 110 at the specific location of the pipeline is not affected even if the ball-type casing 111 may be rotated during the action of rotating in situ, moving straight, moving backwardly or making a turn.

Figure 5:
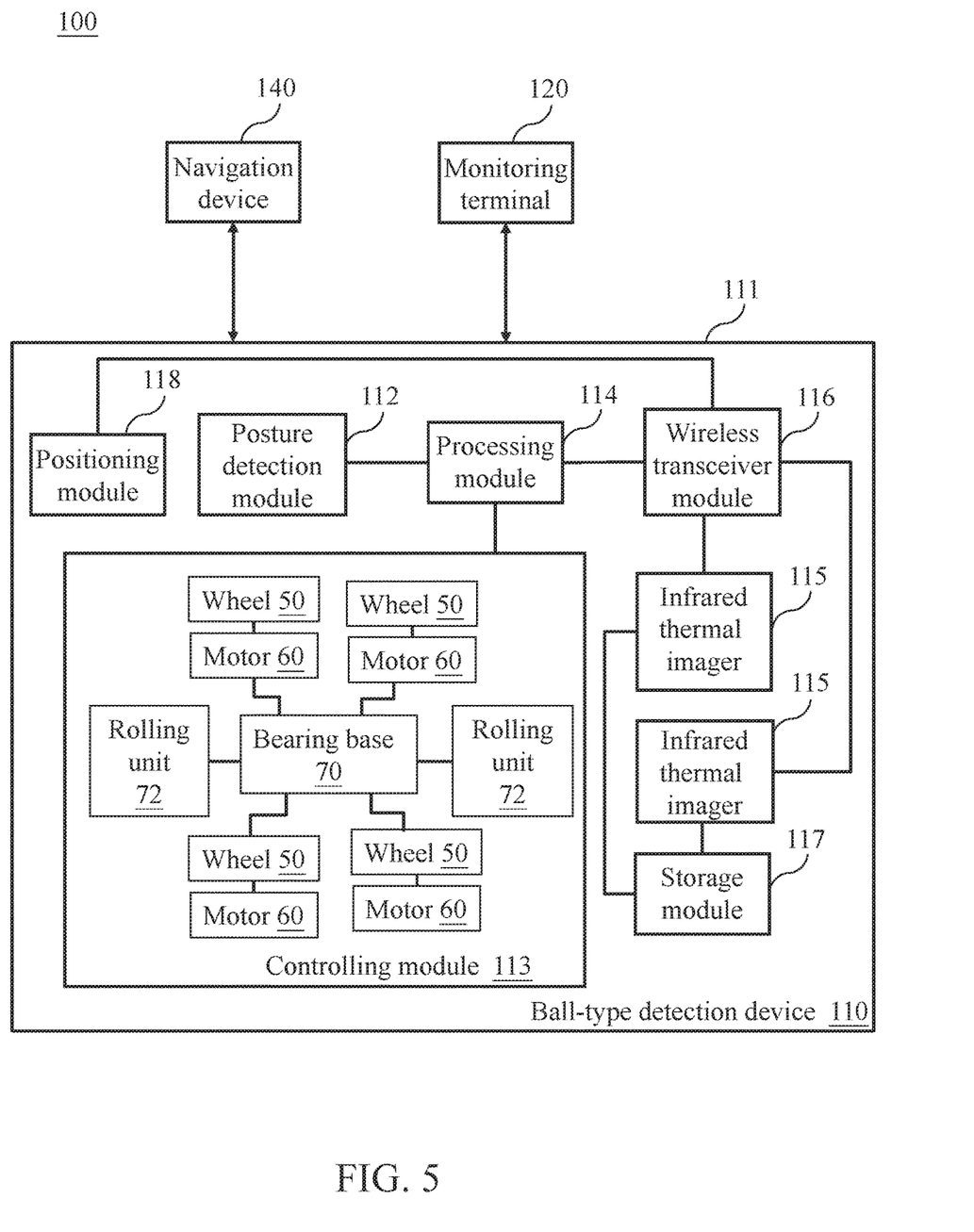
FIG. 5 is a block diagram of a pipeline leakage detection system of alternative embodiment of the present invention.

Please refer to FIG. 5, which is a block diagram of a pipeline leakage detection system of alternative embodiment of the present invention. In this embodiment, the structure of the ball-type detection device 110 is the same as that shown in FIG. 4, so the detailed description is not repeated. In this embodiment, the pipeline leakage detection system 100 can include the ball-type detection device 110, the monitoring terminal 120 and a navigation device 140. The navigation device 140 is configured to receive the positioning information and destination information (that is, the specific location), and the navigation device 140 can calculate a navigation route according to the positioning information, the destination information and the built-in configuration map of exist pipelines, and continuously receive the positioning information and to generate a current navigation signal to continuously transmit the current navigation signal to the wireless transceiver module 116. The processing module 114 can control, according to the navigation signal received by the wireless transceiver module 116, the plurality of motors 60 to drive the plurality of wheels 50, so that the ball-type detection device 110 can be moved to the specific location of the pipeline (that is, the particular location in the anticipated pipeline). As a result, the ball-type detection device 110 can reach the particular location in the anticipated pipeline for detecting leaking location according to the user's requirement.

In greater detail, the positioning module 118 of the ball-type detection device 110 can be, but not limited to, a positioning module having GPS function, and the positioning module 118 is configured to transmit the positioning information to the navigation device 140. The navigation device 140 can allow the user to input the anticipated specific location (that is, the destination information) for leakage detection through an input unit thereof (not shown in figures), such as a keyboard or a microphone. After the navigation device 140 receives the positioning information and destination information, the navigation device 140 can calculate the navigation route according to the positioning information, the destination information and the built-in configuration map of exist pipelines, and continuously receive the positioning information and generate the current navigation signal to continuously transmit the current navigation signal to the wireless transceiver module 116, so that the processing module 114 can control, according to the navigation signal received by the wireless transceiver module 116, the plurality of motors 60 to drive the plurality of wheels 50, so as to move the ball-type detection device 110 to the specific location of the pipeline. The navigation signal can be, but not limited to, the instruction of moving straight or making a turn. Preferably, each wheel 50 can be an omnidirectional wheel, so that the processing module 114 can control, according to the navigation signal; the plurality of motors 60 to drive the plurality of wheels 50; to provide the motion mode of controlling the ball-type casing 111 to move straight or make a turn; as a result, the navigation device 140 can control the ball-type detection device 110 to reach the specific location of the pipeline for detecting leaking location.

Figure 6A:
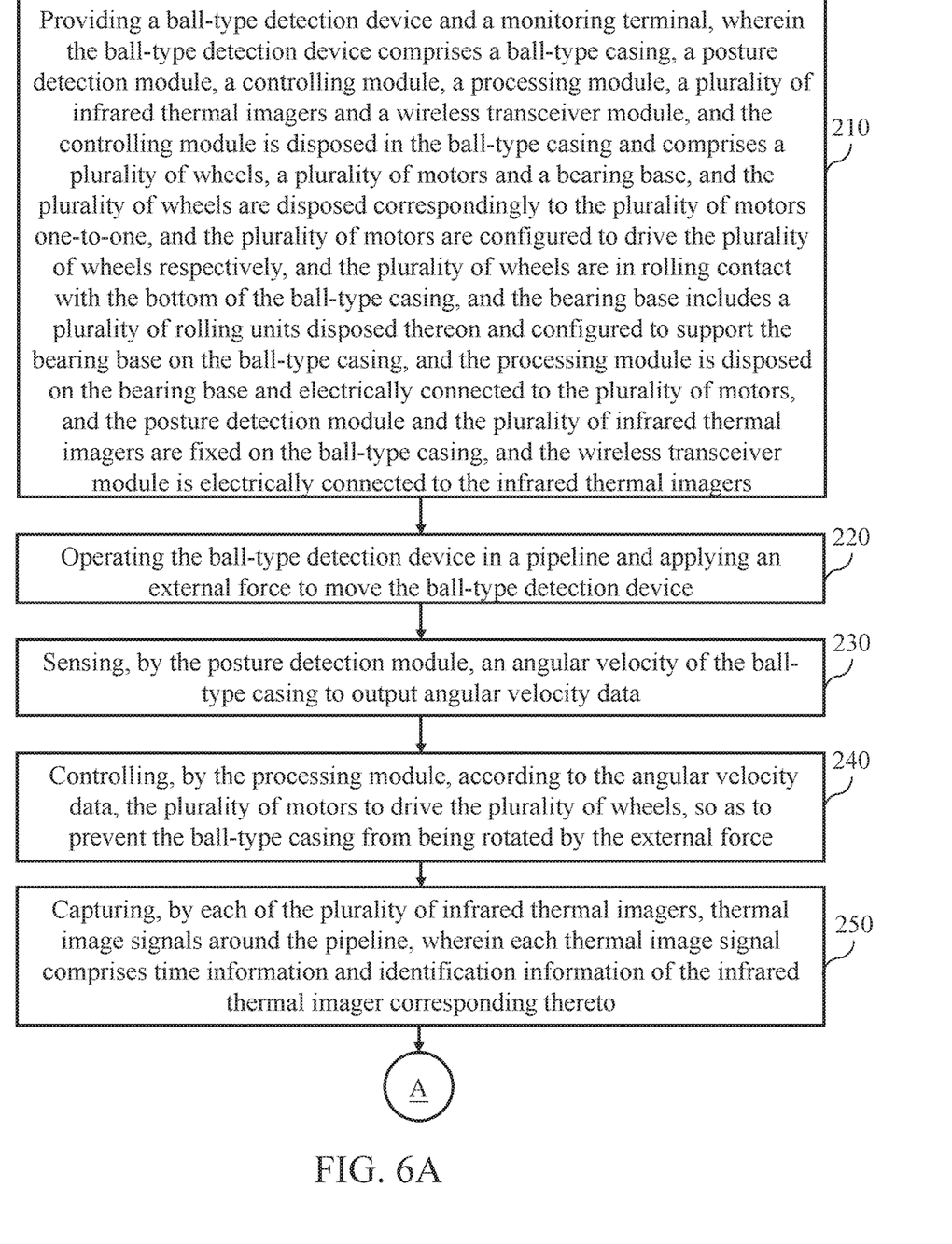
FIGS. 6A and 6B illustrate a flow chart of a pipeline leakage detection method performed by the pipeline leakage detection system of FIG. 1, according to an embodiment of the present invention.
Figure 6B:
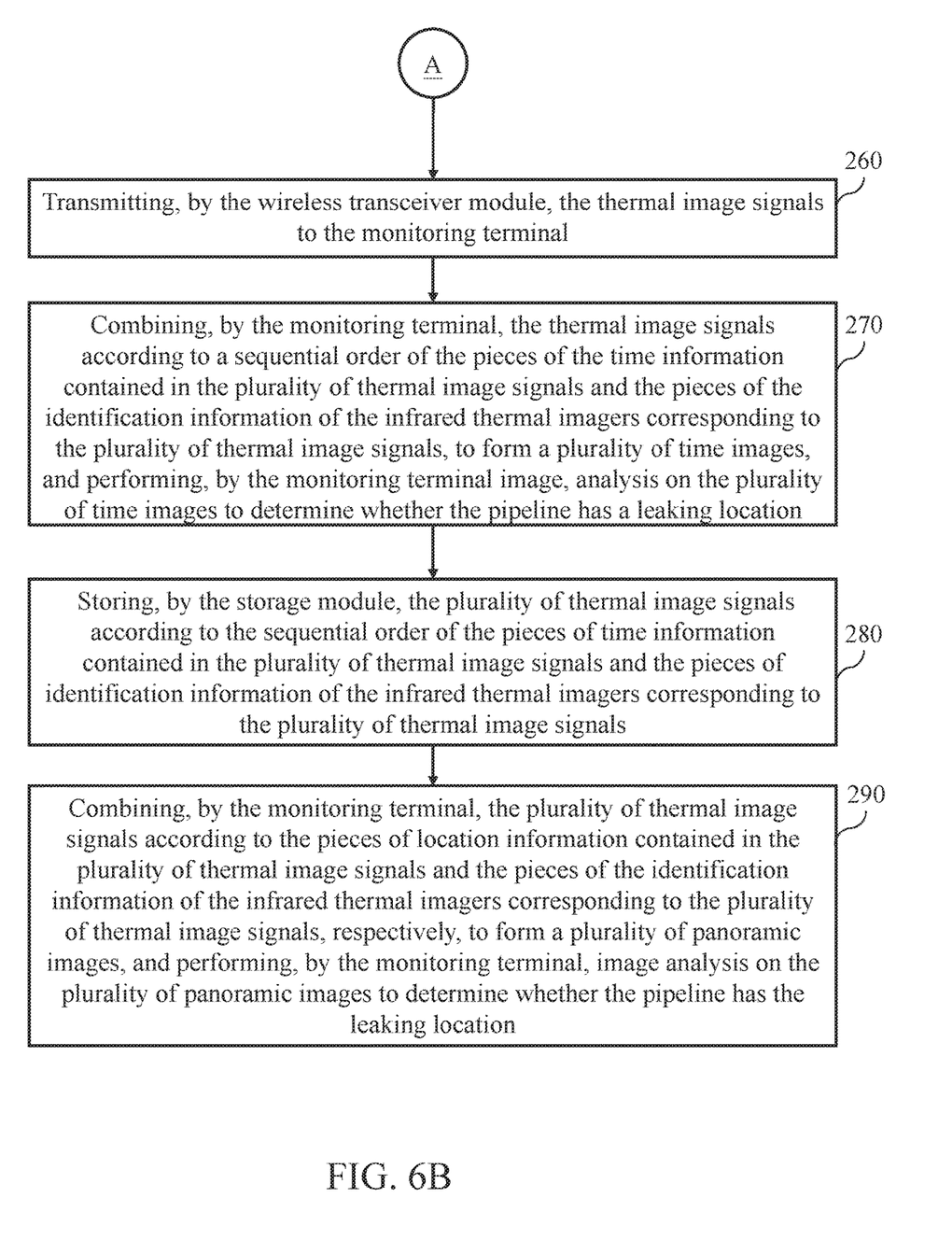

Please refer to FIGS. 6A and 6B, which illustrate a flow chart of a pipeline leakage detection method performed by the pipeline leakage detection system of FIG. 1, according to an embodiment of the present invention. The method includes steps 210 to 270. In the step 210, the ball-type detection device and the monitoring terminal are provided. The ball-type detection device comprises a ball-type casing; a posture detection module, a controlling module; a processing module, a plurality of infrared thermal imagers and a wireless transceiver module; and the controlling module is disposed in the ball-type casing and comprises a plurality of wheels, a plurality of motors and a bearing base, the plurality of wheels are disposed correspondingly to the plurality of motors one-to-one; and the plurality of motors are configured to drive the plurality of wheels, respectively, and the plurality of wheels are in rolling contact with the bottom of the ball-type casing; and, the bearing base can include a plurality of rolling units disposed thereon and the plurality of rolling units are configured to support the bearing base on the ball-type casing; and the processing module is disposed on the bearing base and electrically connected to the plurality of motors; and the posture detection module and the plurality of infrared thermal imagers are fixed on the ball-type casing, and the wireless transceiver module is electrically connected to the infrared thermal imagers. In the step 220; the ball-type detection device is operated in a pipeline and moved by an external force. In the step 230, the posture detection module senses an angular velocity of the ball-type casing to output angular velocity data. In the step 240; the processing module controls, according to the angular velocity data, the plurality of motors to drive the plurality of wheels, so as to prevent the ball-type casing from being rotated by the external force. In the step 250; each infrared thermal imager captures thermal image signals around the pipeline, and each thermal image signal comprises time information and identification information of the infrared thermal imager corresponding thereto. In the step 260, the wireless transceiver module transmits the thermal image signals to the monitoring terminal. In the step 270, the monitoring terminal combines the thermal image signals, according to a sequential order of the pieces of the time information contained in the plurality of thermal image signals and the pieces of the identification information of the infrared thermal imagers corresponding to the plurality of thermal image signals, to form a plurality of time images, and the monitoring terminal perform image analysis on the plurality of time images to determine whether the pipeline has a leaking location.

Through aforementioned steps, while the ball-type detection device is operated in the pipeline and moved by the external force, the processing module can control, according to the angular velocity data sensed and outputted by the posture detection module, the plurality of motors to drive the wheels corresponding thereto, so as to prevent the ball-type casing from being rotated by the external force; and the wireless transceiver module can transmit the thermal image signals around the pipeline and captured by the infrared thermal imagers, to the monitoring terminal; and the monitoring terminal can combine the plurality of thermal image signals, according to the sequential order of the pieces of the time information contained in the plurality of thermal image signals and the pieces of the identification information of the infrared thermal imagers corresponding to the plurality of thermal image signals, to form the plurality of time images, and the monitoring terminal can perform image analysis on the plurality of time images to determine whether the pipeline has the leaking location. The detailed descriptions about these steps are illustrated in aforementioned paragraphs, so the detailed descriptions are not repeated.

In the embodiment, in order to back up and save data, the ball-type detection device can further comprise the storage module, the pipeline leakage detection method can further include a step 280. In the step 280, the storage module stores the plurality of thermal image signals according to the sequential order of the pieces of time information contained in the plurality of thermal image signals and the pieces of identification information of the infrared thermal imagers corresponding to the plurality of thermal image signals. The detailed description about this step is illustrated in aforementioned paragraphs, so the detailed description is not repeated.

In the embodiment, in order to more accurately determine the leaking location of the pipeline, each thermal image signal can further comprise the location information, and the pipeline leakage detection method further includes a step 290. In the step 290, the monitoring terminal combines the plurality of thermal image signals, according to the pieces of the location information contained in the plurality of thermal image signals and the pieces of the identification information of the infrared thermal imagers corresponding to the plurality of thermal image signals, respectively, to form the plurality of panoramic images, and the monitoring terminal can perform image analysis on the plurality of panoramic images to determine whether the pipeline has the leaking location. The detailed description about this step is illustrated in aforementioned paragraphs, so the detailed description is not repeated.

Figure 7:
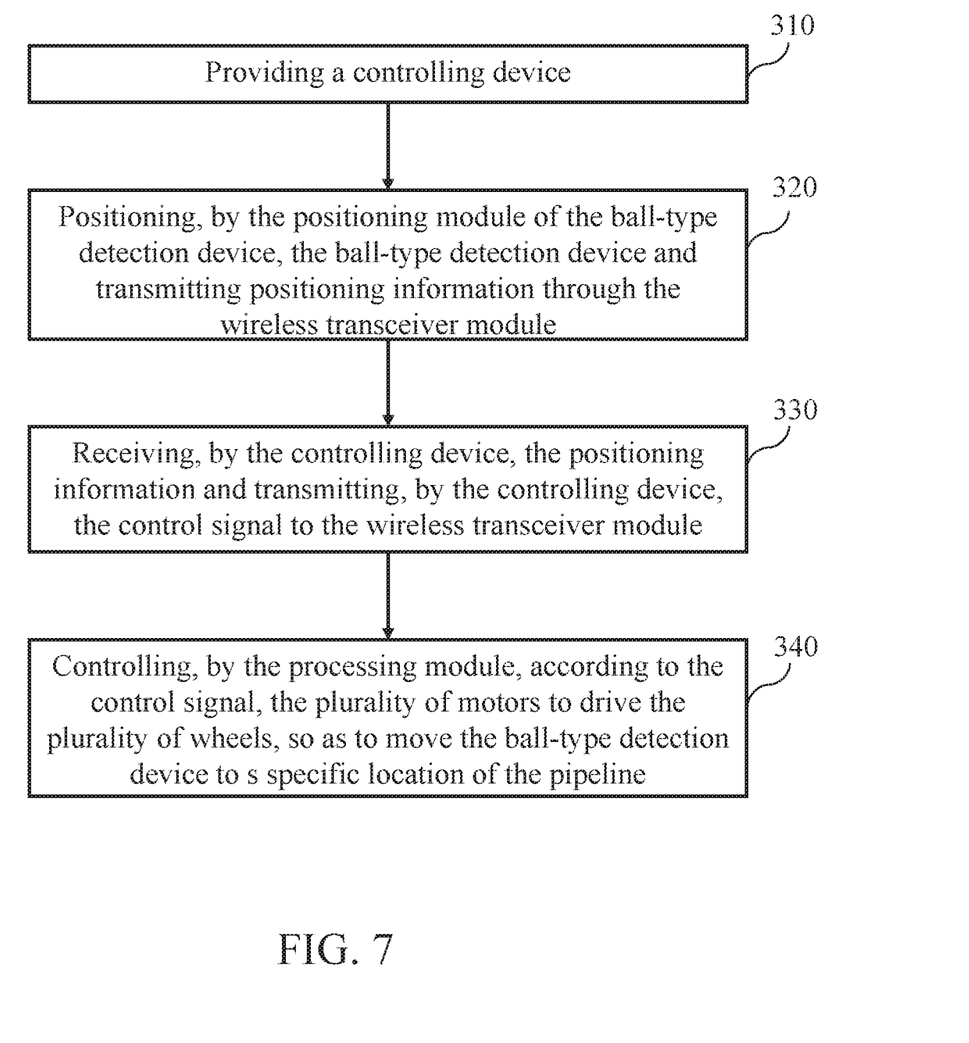
FIG. 7 is a flow chart of a pipeline leakage detection method performed by the pipeline leakage detection system of FIG. 3, according to an embodiment of the present invention.

Please refer to FIG. 7, which is a flow chart of a pipeline leakage detection method performed by the pipeline leakage detection system of FIG. 3, according to an embodiment of the present invention. Besides the steps 210 to 290, the pipeline leakage detection method can further include steps 310 to 340. In the step 310, the controlling device is provided. In the step 320, the positioning module of the ball-type detection device can position the ball-type detection device and transmit the positioning information through the wireless transceiver module. In the step 330, the controlling device can receive the positioning information and transmit the control signal to the wireless transceiver module. In the step 340, the processing module can control, according to the control signal, the plurality of motors to drive the plurality of wheels, so as to move the ball-type detection device to the specific location of the pipeline. Preferably, each wheel can be an omnidirectional wheel, so that when the motors drive the wheels, the controlling module can provide the motion mode of controlling the ball-type casing to rotate in situ, move straight, move backwardly, or make a turn. Through the steps 310 to 340, the ball-type detection device can reach the particular location in the anticipated pipeline for detecting the leaking location according to the user's requirement. The detailed descriptions about these steps are illustrated in aforementioned paragraphs, so the detailed descriptions are not repeated. It should be noted that the steps 210 to 290 are omitted in FIG. 6 for simplicity and the convenience of representation.

Figure 8:
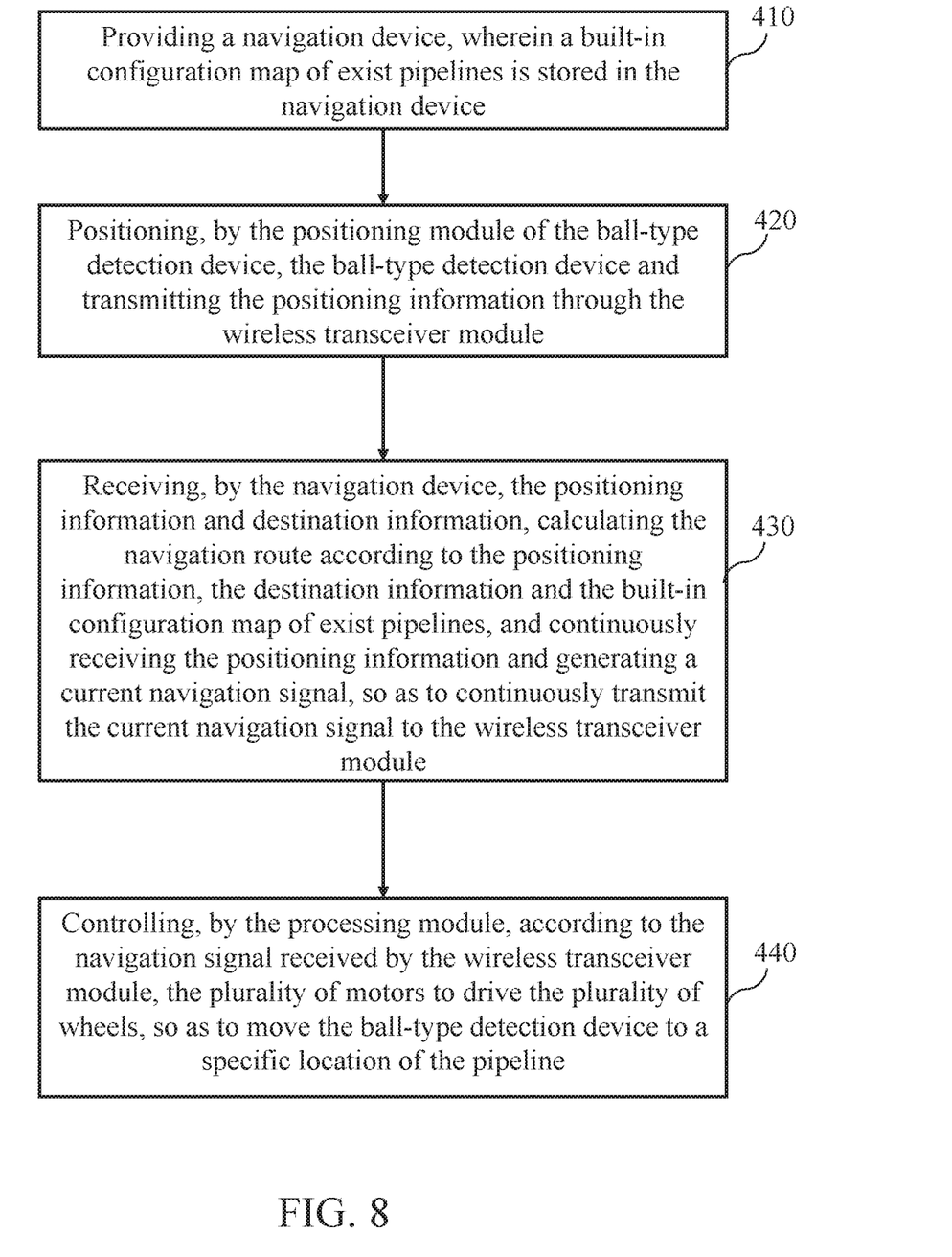
FIG. 8 is a flow chart of a pipeline leakage detection method performed by the pipeline leakage detection system of FIG. 5, according to an embodiment of the present invention.

Please refer to FIG. 8, which is a flow chart of a pipeline leakage detection method performed by the pipeline leakage detection system of FIG. 5, according to an embodiment of the present invention. Besides the steps 210 to 290, the pipeline leakage detection method can further include steps 410 to 440. In the step 410, the navigation device is provided, and the built-in configuration map of exist pipelines is stored in the navigation device. In the step 420, the positioning module of the ball-type detection device can position the ball-type detection device and transmit the positioning information through the wireless transceiver module. In the step 430, the navigation device can receive the positioning information and the destination information, and calculate the navigation route according to the positioning information, the destination information and the built-in configuration map of exist pipelines, and the navigation device can continuously receive the positioning information and generate the current navigation signal, so as to continuously transmit the current navigation signal to the wireless transceiver module. In the step 440, the processing module can control, according to the navigation signal received by the wireless transceiver module, the plurality of motors to drive the plurality of wheels, so as to move the ball-type detection device to the specific location of the pipeline. Preferably, each wheel can be an omnidirectional wheel, so that when the motors drive the wheels, the controlling module can provide the motion mode of controlling the ball-type casing to move straight or make a turn. Through the steps 410 to 440, the ball-type detection device can reach the particular location in the anticipated pipeline for detecting the leaking location according to the user's requirement. The detailed descriptions about these steps are illustrated in aforementioned paragraphs, so the detailed descriptions are not repeated. It should be noted that the steps 210 to 290 are omitted and not drawn in FIG. 8 for simplicity and the convenience of representation.

It should be noted that the steps of aforementioned pipeline leakage detection method can be performed in any sequential order, unless the cause-effect relation specifically indicated herein.

In summary, the difference between the conventional technology and the technology of the present invention is that, in the system and the method of the present invention, the ball-type detection device can be operated in the pipeline and moved by the external force, and the processing module can control, according to the angular velocity data sensed and outputted by the posture detection module, the motors to drive the wheels corresponding thereto, so as to prevent the ball-type casing from being rotated by the external force; and the wireless transceiver module can transmit the thermal image signals around the pipeline and captured by the infrared thermal imagers, to monitoring terminal; and, the monitoring terminal can combine the plurality of thermal image signals, according to the sequential order of the pieces of time information contained in the plurality of thermal image signals and the pieces of the identification information of the infrared thermal imagers corresponding to the plurality of thermal image signals, to form the plurality of time ages, and the monitor terminal can perform image analysis on the plurality of time images to determine whether to have the leaking location.

The present invention disclosed herein has been described by means of specific embodiments. However, numerous modifications, variations and enhancements can be made thereto by those skilled in the art without departing from the spirit and scope of the disclosure set forth in the claims.

What is claimed is:
1. A pipeline leakage detection system, comprising:
 a ball-type detection device operated in a pipeline and moved by an external force, and comprising:
  a ball-type casing;
  a posture detection module fixed on the ball-type casing and configured to sense an angular velocity of the ball-type casing to output angular velocity data;
  a controlling module disposed in the ball-type casing, and comprising a plurality of wheels, a plurality of motors and a bearing base, wherein the plurality of wheels are disposed correspondingly to the plurality of motors one-to-one, and the plurality of motors are configured to drive the plurality of wheels, and the plurality of wheel are in rolling contact with a bottom of the ball-type casing, and the bearing base is configured to carry the posture detection module and comprises a plurality of rolling units disposed thereon, and the plurality of rolling units are configured to support the bearing base on the ball-type casing;
  a processing module disposed on the bearing base and electrically connected to the plurality of motors, and configured to control, according to the angular velocity data, the plurality of motors to drive the plurality of wheels, so as to prevent the ball-type casing from being rotated by the external force;

a plurality of infrared thermal imagers fixed on the ball-type casing, wherein each of the plurality of infrared thermal imagers is configured to capture thermal image signals around the pipeline, and each of the thermal image signals comprises time information and identification information of the infrared thermal imager corresponding thereto; and a wireless transceiver module electrically connected to the plurality of infrared thermal imagers and configured to transmit the plurality of thermal image signals; and a monitoring terminal configured to combine the plurality of thermal image signals, according to a sequential order of the pieces of time information contained in the plurality of thermal image signals and the pieces of identification information of the infrared thermal imagers corresponding to the plurality of thermal image signals, respectively, to form a plurality of time images, and perform image analysis on the plurality of time images to determine whether the pipeline has a leaking location.

2. The pipeline leakage detection system according to claim 1, wherein the each of the plurality of thermal image signals further comprises location information, and the monitoring terminal combines the plurality of thermal image signals, according to the pieces of location information contained in the plurality of thermal image signals and the identification information of the plurality of infrared thermal imagers corresponding to the plurality of thermal image signals, respectively, to form a plurality of panoramic images, and performs image analysis on the plurality of panoramic images to determine whether the pipeline has the leaking location.

3. The pipeline leakage detection system according to claim 1, wherein the ball-type detection device further comprises a storage module configured to store the plurality of thermal image signals according to the sequential order of the pieces of time information contained in the plurality of thermal image signals and the pieces of identification information of the infrared thermal imagers corresponding to the plurality of thermal image signals, respectively.

4. The pipeline leakage detection system according to claim 1, wherein each of the plurality of wheels is an omnidirectional wheel, and when the plurality of motors drives the plurality of wheels, the controlling module provides a motion mode of controlling the ball-type casing to rotate in situ, move straight, move backwardly, or make a turn.

5. The pipeline leakage detection system according to claim 1, wherein the ball-type detection device comprises a positioning module disposed on the bearing base and electrically connected to the processing module, and configured to position the ball-type detection device and transmit positioning information through the wireless transceiver module, and the pipeline leakage detection system comprises a controlling device configured to receive the positioning information and transmit a control signal to the wireless transceiver module, and the processing module controls, according to the control signal, the plurality of motors to drive the plurality of wheels, so as to move the ball-type detection device to a specific location of the pipeline.

6. A pipeline leakage detection method, comprising:
providing a ball-type detection device and a monitoring terminal, wherein the ball-type detection device comprises a ball-type casing, a posture detection module, a controlling module, a processing module, a plurality of infrared thermal imagers and a wireless transceiver module, and the controlling module is disposed in the ball-type casing and comprises a plurality of wheels, a plurality of motors and a bearing base, and the plurality of wheels are disposed correspondingly to the plurality of motors one-to-one, and the plurality of motors are configured to drive the plurality of wheels, and the plurality of wheels are in rolling contact with a bottom of the ball-type casing, and the bearing base comprises a plurality of rolling units disposed thereon to support the bearing base on the ball-type casing, and the processing module is disposed on the bearing base and electrically connected to the plurality of motors, and the posture detection module and the plurality of infrared thermal imagers are fixed on the ball-type casing, and the wireless transceiver module is connected to the plurality of infrared thermal imagers;

operating the ball-type detection device in a pipeline, and applying an external force to move the ball-type detection device;

sensing, by the posture detection module, an angular velocity of the ball-type casing to output angular velocity data;

controlling, by the processing module, according to the angular velocity data, the plurality of motors to drive the plurality of wheels, to prevent the ball-type casing from being rotated by the external force;

capturing, by each of the plurality of infrared thermal imagers, thermal image signals around the pipeline, wherein each of the plurality of thermal image signals comprises time information and identification information of the infrared thermal imager corresponding thereto;

transmitting, by the wireless transceiver module, the plurality of thermal image signals to the monitoring terminal; and combining, by the monitoring terminal, the plurality of thermal image signals, according to a sequential order of the pieces of time information contained in the plurality of thermal image signals and the pieces of identification information of the plurality of infrared thermal imagers corresponding to the plurality of thermal image signals, respectively, to form a plurality of time images, and performing, by the monitoring terminal, image analysis on the plurality of time images to determine whether the pipeline has a leaking location.

7. The pipeline leakage detection method according to claim 6, wherein each of the plurality of thermal image signals comprises location information, and the pipeline leakage detection method further comprises:
combining, by the monitoring terminal, the plurality of thermal image signals, according to the pieces of the location information contained in the plurality of thermal image signals and the pieces of identification information of the plurality of infrared thermal imagers corresponding to the plurality of thermal image signals, respectively, to form a plurality of panoramic images; and performing, by the monitoring terminal, image analysis on the plurality of panoramic images to determine whether the pipeline has the leaking location.

8. The pipeline leakage detection method according to claim 6, wherein the ball-type detection device further comprises a storage module configured to store the plurality of thermal image signals according to the sequential order of the pieces of time information contained in the plurality of thermal image signals and the pieces of identification information of the plurality of infrared thermal imagers corresponding to the plurality of thermal image signals, respectively.

9. The pipeline leakage detection method according to claim 6, wherein each of the plurality of wheels is an omnidirectional wheel, and when the plurality of motors drives the plurality of wheels, the controlling module provides a motion mode of controlling the ball-type casing to rotate in situ, move straight, move backwardly, or make a turn.

10. The pipeline leakage detection method according to claim 6, further comprising:
- providing a controlling device;
- positioning the ball-type detection device, by a positioning module of the ball-type detection device, and transmitting positioning information through the wireless transceiver module;
- receiving, by the controlling device; the positioning information and transmitting a control signal to the wireless transceiver module; and
- controlling, by the processing module, according to the control signal, the plurality of motors to drive the plurality of wheels, so as to move the ball-type detection device to a specific location of the pipeline.

* * * * *